(12) United States Patent
Berg et al.

(10) Patent No.: US 10,320,213 B2
(45) Date of Patent: Jun. 11, 2019

(54) APPARATUS AND METHOD TO APPLY VOLTAGE TO FUEL CELL STACK FROM HIGH VOLTAGE SYSTEM FOR USAGE DURING DIAGNOSTIC TESTS

(71) Applicant: GM GLOBAL TECHNOLOGY OPERATIONS LLC, Detroit, MI (US)

(72) Inventors: Joseph Berg, West Bloomfield, MI (US); Kenneth L. Kaye, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 329 days.

(21) Appl. No.: 15/216,149

(22) Filed: Jul. 21, 2016

(65) Prior Publication Data

US 2018/0026463 A1  Jan. 25, 2018

(51) Int. Cl.
*H01M 8/04858* (2016.01)
*H02M 3/158* (2006.01)
*H02J 1/00* (2006.01)
*H02J 7/00* (2006.01)
*H01M 8/04992* (2016.01)
*H02M 3/156* (2006.01)

(52) U.S. Cl.
CPC ......... *H02J 7/0052* (2013.01); *H01M 8/0488* (2013.01); *H01M 8/04873* (2013.01); *H01M 8/04888* (2013.01); *H01M 8/04992* (2013.01); *H02M 3/156* (2013.01); *H02M 3/158* (2013.01); *H01M 2250/20* (2013.01); *H02J 2001/004* (2013.01); *H02J 2007/0059* (2013.01); *Y02T 90/32* (2013.01)

(58) Field of Classification Search
CPC ............... H02J 7/0052; H02J 2001/004; H02J 2007/0059; H01M 8/04873; H01M 8/04888; H01M 8/0488; H01M 8/04992; H01M 2250/20; H02M 3/158; H02M 3/156
USPC ........................................................ 320/101
See application file for complete search history.

(56) References Cited

U.S. PATENT DOCUMENTS 7,586,762 B2 * 9/2009 Hsu ...................... G09G 3/3406
315/160
7,810,595 B2 * 10/2010 Moran .............. H01M 8/04089
180/65.31

(Continued)

*Primary Examiner* — M Baye Diao
(74) *Attorney, Agent, or Firm* — Reising Ethington P.C.

(57) ABSTRACT

A fuel cell charging system includes a fuel cell stack having a first operating direct current (DC) voltage between fuel check stack terminals, a high voltage system operating at a first DC operating voltage different than and generally higher than the first operating voltage of the fuel cell stack, a boost converter in electrical connection with the fuel cell stack and the high voltage system, and a stack charging component that applies a second DC operating voltage, generally of lower value than that of the first normal operating voltage, to the fuel cell stack. The boost converter transfer electrical power from the fuel cell stack to the high voltage system during fuel cell operation. Characteristically, the second DC operating voltage applied to the fuel cell stack terminals is typically lower in value than that of the first DC operating voltage of both the fuel cell stack and the HV electrical system and is stepped down from the first DC operating voltage of the HV electrical system.

14 Claims, 3 Drawing Sheets

(56) References Cited

U.S. PATENT DOCUMENTS

| | | | | |
|---|---|---|---|---|
| 8,008,808 B2* | 8/2011 | Seeker | ................... | H02J 1/102 |
| | | | | 307/72 |
| 8,450,021 B2* | 5/2013 | Lienkamp | ........... | B60L 11/1887 |
| | | | | 323/273 |
| 9,068,922 B2* | 6/2015 | Foley | ................ | H01M 8/04992 |
| 9,799,936 B2* | 10/2017 | Kazuno | ............... | H01M 16/006 |
| 2010/0078997 A1* | 4/2010 | Chen | ........................ | B60L 1/00 |
| | | | | 307/31 |
| 2011/0217609 A1* | 9/2011 | Mallavarapu | ........... | H01M 8/04 |
| | | | | 429/429 |
| 2016/0133959 A1* | 5/2016 | Kwon | ................ | H01M 8/0488 |
| | | | | 429/429 |
| 2018/0229622 A1* | 8/2018 | Matsumoto | ............. | H01M 8/04 |

\* cited by examiner

APPARATUS AND METHOD TO APPLY VOLTAGE TO FUEL CELL STACK FROM HIGH VOLTAGE SYSTEM FOR USAGE DURING DIAGNOSTIC TESTS

TECHNICAL FIELD

In a least one aspect, the present invention is related to systems and methods for charging a fuel cell stack to a voltage that is useful for performing diagnostic tests.

BACKGROUND

Fuel cell stacks are used as an electrical power source in many applications. In particular, fuel cell stacks are proposed for use in automobiles to replace internal combustion engines. In typical applications, fuel cell stacks are provided in arrays of many individual fuel cells in order to provide high levels of electrical power. The complexity of fuel cell stacks which can have several hundred individual fuel cells necessitates that strategies and conditions for efficient testing be developed.

Accordingly, there is a need for fuel cell charging systems that can maintain a fuel cell stack at a voltage that is useful for performing a certain subset of diagnostic tests.

SUMMARY

The present invention solves one or more problems of the prior art, by providing in at least one embodiment, a fuel cell charging system that transfers electrical power from a high voltage electrical system to a fuel cell stack. The fuel cell charging system includes a fuel cell stack having a first direct current (DC) voltage between fuel check stack terminals, a high voltage system operating at a first DC operating voltage, different than, and generally higher than that of the first voltage of the fuel cell stack, a boost converter in electrical connection with the fuel cell stack and the high voltage system, and a step down voltage component that applies a second DC operating voltage to the fuel cell stack. The fuel cell stack voltage is at (i.e., outputs) the first voltage during normal fuel cell operation. The boost converter transfers electrical power from the fuel cell stack to the high voltage system during normal fuel cell operation. Characteristically, the second DC operating voltage is stepped down from the first DC operating voltage of the high voltage electrical system to a fuel cell stack charging voltage that is lower than the first voltage of the fuel cell stack. The fuel cell charging system also includes an FCS (fuel cell system) controller that is operable to send control signals to the boost converter and the step down voltage component. The present embodiment uses a switch/resistor combination across a standard boost converter in conjunction with standard stack discharge circuitry already present in the system to apply and regulate the value of voltage applied to the terminals of the stack for diagnostic algorithms. Advantageously, the fuel call charging system allows implementation of a stack charging function with potential reduced cost from an implementation that requires an additional insulated-gate bipolar transistor (IGBT) module in a boost converter to create a buck converter to control voltage at stack terminals.

DETAILED DESCRIPTION

Figure 1:
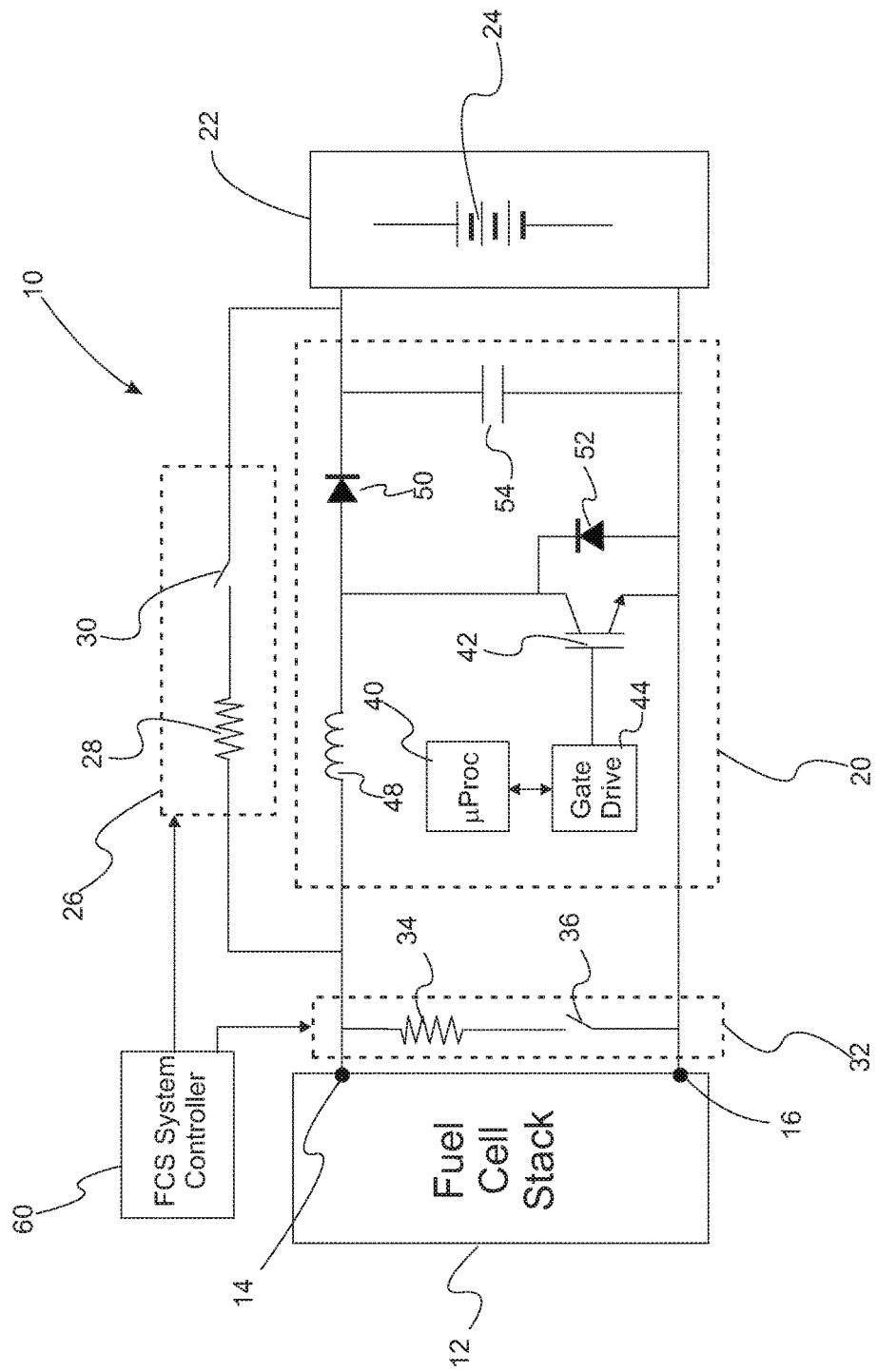
FIG. 1 is a schematic illustration of a fuel cell charging system that utilizes a switch and transistor for charging a fuel cell stack.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

With reference to FIG. 1, a schematic illustration of a system to apply a voltage to a fuel cell stack from a high voltage is provided. Fuel cell charging system 10 includes fuel cell stack 12 which includes a plurality of individual fuel cells. Fuel cell stack 12 is characterized by a fuel cell stack voltage between voltage terminals 14, 16. During normal fuel cell operation, the fuel cell stack voltage is at a first voltage that is outputted to a load. In typical automotive applications, fuel cell stack includes from 20 to 350 (or more) individual fuel cells each operating at a voltage from about 0.6 to 1.22 volts per fuel cell. Therefore, the fuel cell stack voltage can be between 12 to 430 volts. Boost converter 20 is in electrical connection with fuel cell stack 12 and high voltage system 22. High voltage system 22 operates at a first DC operating voltage. The first DC operating voltage of high voltage system 22 is higher than the first voltage which is outputted by the fuel cell stack 12. Boost converter 20 transfers electrical power from fuel cell stack 12 to the high voltage system 22 during fuel cell operation. In a refinement, high voltage system 22 provides voltage to a vehicle in which fuel cell charging system 10 and fuel cell stack 12 is incorporated. Typically high voltage system 22 includes high voltage battery 24. Stack charging component 26 applies a second DC operating voltage in a time controlled manner to the fuel cell stack 12 between voltage output terminals 14, 16. In the variation depicted in FIG. 1, stack charging component 26 utilizes resistor 28 and switch 30 to accomplish reducing the voltage applied to terminals 14 and 16 of fuel cell stack 12. Characteristically, the second DC operating voltage is stepped down from the first DC operating voltage high voltage system 22 to a charging voltage that is lower than the first voltage of fuel cell stack 12 outputted during normal operation.

Fuel cell system 10 also includes stack discharge circuit 32 for reducing the voltage of the fuel cell stack through resistive energy discharge during other modes of operation. For this purpose, stack discharge circuit 32 includes resistor 34 and switch 36. Switch 30 allows for the connection of the circuit between the fuel cell stack and the high voltage system. Resistor 28 is sized to limit the inrush of current to the fuel cell stack and to control the rate of voltage rise across terminals 14, 16. Stack discharge circuit 32 is used initially to bring down the voltage within a predetermined voltage window having an upper voltage limit and a lower voltage limit. In a refinement, the predetermined voltage window is from 10 to 30 volts. In a further refinement, the upper voltage limit is from 25 to 50 volts and the lower voltage limit is from 15 to 25 volts. Stack charging component 26 is then used bring the voltage up if the level falls to low.

Still referring to FIG. 1, boost converter 20 is typically a standard boost used in fuel cell systems to provide electrical power from a fuel cell stack to a high voltage system. Boost converter 20 include microprocessor 40 which controls transistor 42 via gate controller 44. Boost converter accomplishes the power transfer to the high voltage system via switch 42, inductor 48, diode 50, diode 52, and capacitor 54. The function of a boost converter is to increase the input voltage to a higher output level. This is achieved through Pulse Width Modulation control of transistor 42. During time that transistor 42 is on (TON) the current from the Fuel Cell Stack System flows through inductor 48 and transistor 42. The energy returns to fuel cell stack through wire 56 thereby creating energy stored in inductor 48 as well as a voltage rise across inductor 48. When transistor 42 transitions off the energy stored in inductor 48 causes the current to flow to the output load (i.e., high voltage system 22) and the voltage at the output of boost converter 20 is the sum of the voltage across the inductor and the stack voltage, which is higher than the initial input voltage from the fuel cell stack. In a normal fuel cell application, the boost converter microprocessor 40 controls the stack average output current (boost input current) by regulation of the duty cycle.

Fuel cell system 10 also includes FCS controller 60. FCS controller 60 is used to control boost converter 20 and stack discharge circuitry 32. In this regard, the term "operable" means that FCS controller 60 either issues control signals and/or instructions to a device being controlled to perform a certain function or to return a measurement from a sensor. For example, during the operation of FCS controller 60, FCS controller issues control signals to microprocessor 40 of boost converter 20. These functions for stack FCS controller 60 are standard for many prior art systems. However, in the present embodiment FCS controller 60 also controls stack charging component 26 by enabling and disabling charging of fuel cell stack 12 from high voltage system 22. In particular, FCS controller 60 is operable to disable the boost converter when the second DC operating voltage is applied to fuel cell stack 12 during diagnostic mode operation. FCS controller 60 determines if the fuel cell stack voltage is within the predetermined voltage window. Therefore, FCS controller 60 is operable to send a control signal to enable the stack discharge circuit when the fuel cell stack voltage is above the upper voltage limit and to send a control signal to disable the stack discharge circuit when the fuel cell stack voltage is below the upper voltage limit. Advantageously, FCS controller 60 is operable to perform diagnostic test when the fuel cell stack voltage is within the predetermined voltage window.

Figure 2:
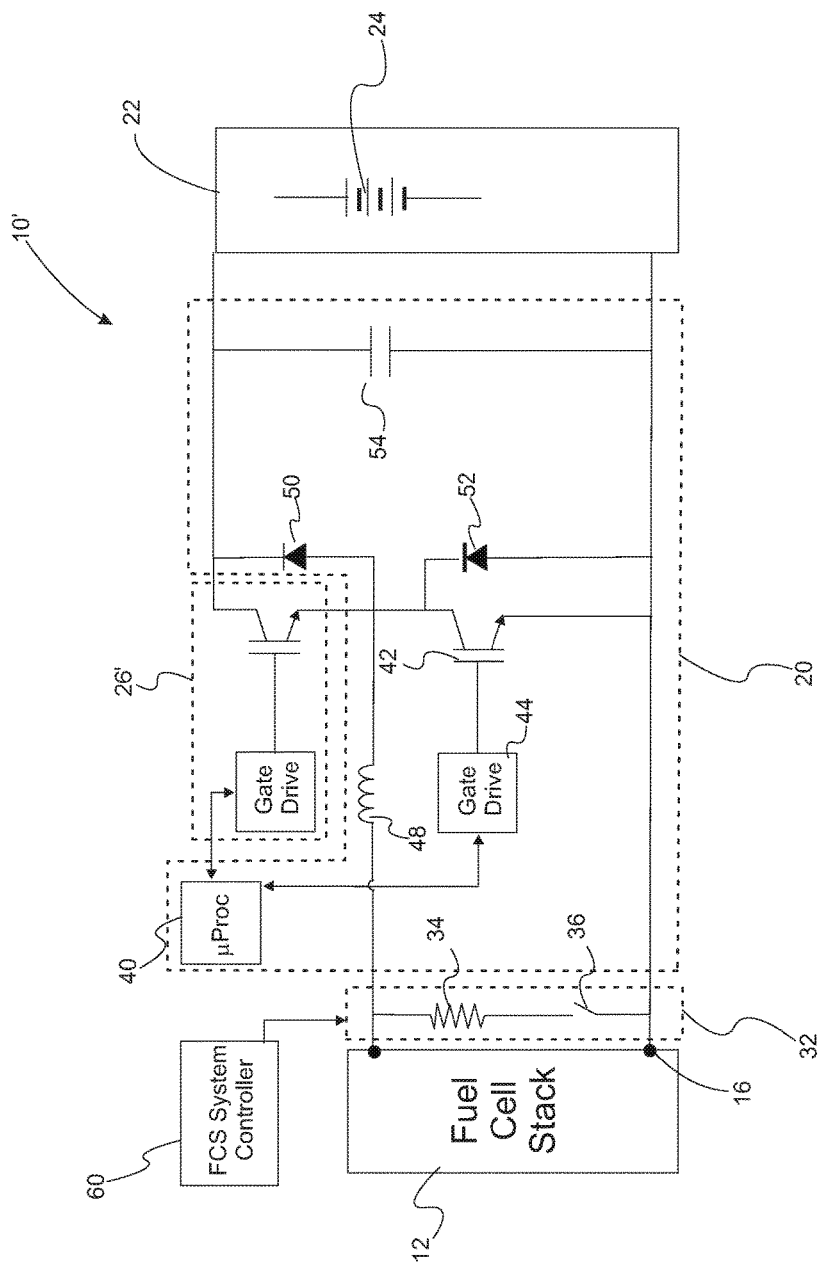
FIG. 2 is a schematic illustration of a fuel cell charging system that utilizes a buck converter for charging a fuel cell stack.

With reference to FIG. 2, a schematic illustration of a different system to apply a voltage to a fuel cell stack from a high voltage is provided. Fuel cell charging system 10' includes fuel cell stack 12 which includes a plurality of individual fuel cells. Fuel cell stack 12 has a fuel cell stack voltage between voltage terminals 14, 16. During normal fuel cell operation, the fuel cell stack voltage is a first voltage that is outputted. Boost converter 20 is in electrical connection with fuel cell stack 12 and high voltage system 22. High voltage system 22 operates at a first DC operating voltage. The first DC operating voltage is higher than the first voltage of the voltage seen at terminals 14 and 16 of fuel cell stack 12. Boost converter 20 transfers electrical power from fuel cell stack 12 to the high voltage system 22 during fuel cell operation. In a refinement, high voltage system 22 provides voltage to a vehicle in which fuel cell charging system 10 and fuel cell stack 12 is incorporated. Typically high voltage system 22 includes high voltage battery 24. Step down voltage component 26' applies a second DC operating voltage to the fuel cell stack 12 between voltage output terminals 14, 16. In the variation depicted in FIG. 2, step down voltage component 26' is a buck converter. In a refinement, microprocessor 40 is used to control both boost convert 20 and the buck converter. Characteristically, the second DC operating voltage is stepped down from the first DC operating voltage to a charging voltage that is lower than the first voltage by the buck converter. Fuel cell system 10' also includes stack discharge circuit 32 for discharging the fuel cell stack when necessary. For this purpose, includes stack discharge circuit 32 includes resistor 34 and switch 36. In this variation using a buck converter, stack discharge circuit 32 may or may not be disabled. The details of boost converter 20 and FCS controller 60 are set forth above in the description of FIG. 1. As set forth above, FCS controller 60 controls the buck converter by enabling and disabling charging of fuel cell stack 12 from high voltage system 22. In particular, FCS controller 60 is operable to disable the boost converter when the second DC operating voltage is applied to fuel cell stack 12. FCS controller 60 determines if the fuel cell stack voltage is within the predetermined voltage window. Advantageously, FCS controller 60 is operable to perform diagnostic test when the fuel cell stack voltage is within the predetermined voltage window.

Figure 3:
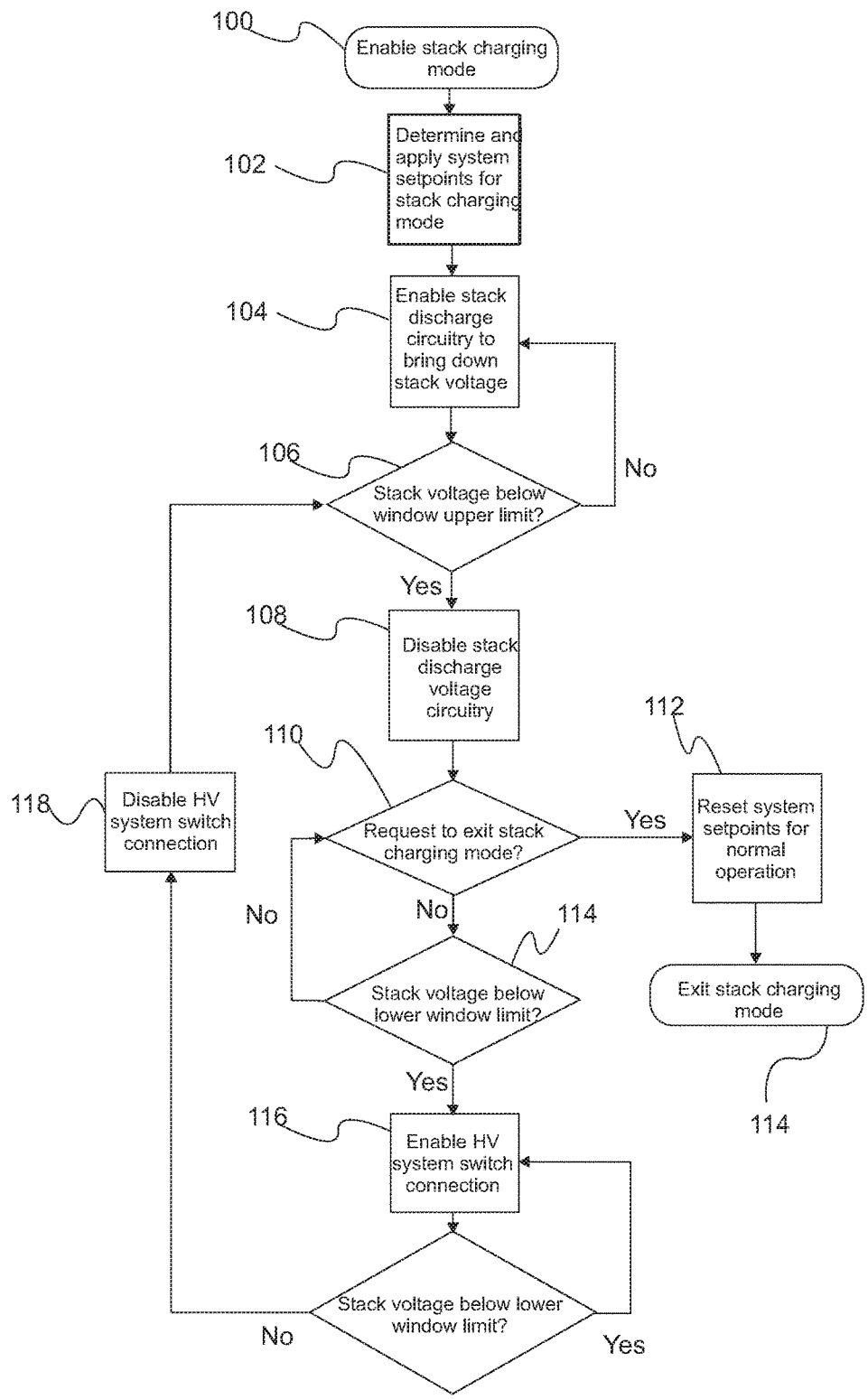
FIG. 3 is a flowchart illustrating the operation of the fuel cell charging systems of FIG. 1.

With reference to FIGS. 1 and 3, the operation of the fuel cell charging systems is described. FIG. 3 is a flowchart illustrating the protocol followed by the systems of FIG. 1 for charging the fuel cell stack is provided. Each of the steps set forth in FIG. 3 can be performed by FCS controller 60 by sending appropriate control signals or manually by a user. In block 100, the fuel cell stack charging mode is enabled. This enabling typically occurs by a user operating FCS controller 60, but can in certain operating modes occur as an automatic function. In block 102, the set points for the stack charging mode are determined and applied. The operations in block 102 can be performed by a user and/or FCS controller 60. These set points include the upper and lower limits of a window for the voltage that is to be applied to fuel cell stack 12. In block 104, FCS controller 60 enables stack discharge circuit 32 to bring down stack voltage.

In block 106, FCS controller 60 determines whether or not the stack voltage below is below the window upper limit. If the stack voltage is below the window upper limit, FCS controller 60 disables stack discharge voltage circuit 32 (block 108). If the stack voltage is below the window upper limit, FCS controller 60 continues to keep stack discharge voltage circuit 32 enabled until the stack voltage is below the upper window limit. When the stack voltage is below the upper window limit, FCS controller 60 determines if a request to exit stack charging mode has been made (block 110). If a request is made to exit stack charging mode, FCS controller 60 resets system set points for normal fuel cell operation (block 112) and then causes the system to exit stack charging mode (block 114). If such a request is not made, FCS controller 60 determines if the stack voltage is below the lower limit of the voltage window. If the stack voltage is not below the lower limit, the system returns to the operations of block 110 which can include conduction the diagnostic tests. If the stack voltage is below the lower window limit, the system proceeds to execute the operations of block 116 in which the FCS controller 60 sends a control signal to stack charging component 26 to charge fuel cell stack 12. If the stack voltage is below the lower window limit, the system returns the operations of block 116 in which stack charging component 26 continues to charge fuel cell stack 12. If the stack voltage is not below the lower window limit, FCS controller 60 sends a control signal to disable switch 30 of stack charging component 26. The system then cycles back to perform the operations of block 106 in which FCS controller 60 queries to determine is the stack voltage is below the window upper limit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell charging system comprising:
   a fuel cell stack having a fuel cell stack voltage between fuel cell stack terminals, the fuel cell stack voltage being at a first voltage during normal fuel cell operation;
   a high voltage electrical system operating at a first DC operating voltage, the first DC operating voltage being higher than the first voltage of the fuel cell stack;
   a boost converter in electrical connection with the fuel cell stack and the high voltage electrical system, the boost converter transferring electrical power from the fuel cell stack to the high voltage electrical system during normal fuel cell operation;
   a stack charging component in electrical connection with the fuel cell stack and the high voltage electrical system and which steps down the first DC operating voltage of the high voltage electrical system to a second DC operating voltage that is lower than the first DC operating voltage, the stack charging component further applying the second DC operating voltage to the fuel cell stack as a charging voltage; and
   a FCS controller operable to disable the boost converter and enable the stack charging component to apply the second DC operating voltage to the fuel cell stack.

2. The fuel cell charging system of claim 1 further comprising a stack discharge circuit that when enabled reduces the voltage of the fuel cell stack through resistive energy discharge.

3. The fuel cell charging system of claim 2 wherein the FCS controller is operable to enable the stack discharge circuit to reduce the fuel cell stack voltage to within predetermined voltage window having an upper voltage limit and a lower voltage limit when the boost converter is disabled and the stack charging component is enabled to apply the second DC operating voltage to the fuel cell stack.

4. The fuel cell charging system of claim 3 wherein the upper voltage limit is from 25 to 50 volts and the lower voltage limit is from 15 to 25 volts.

5. The fuel cell charging system of claim 3 wherein the predetermined voltage window is from 10 to 30 volts.

6. The fuel cell charging system of claim 3 wherein the FCS controller is operable to perform diagnostic test when the fuel cell stack voltage is within the predetermined voltage window.

7. The fuel cell charging system of claim 1 wherein the stack charging component includes a resistor and a switch.

8. The fuel cell charging system of claim 1 wherein the stack charging component is a buck converter that includes a transistor controlled by a gate controller.

9. A fuel cell charging system comprising:
   a fuel cell stack having a fuel cell stack voltage between fuel cell stack terminals, the fuel cell stack voltage being at a first voltage during normal fuel cell operation;
   a high voltage electrical system operating at a first DC operating voltage, the first DC operating voltage being higher than the first voltage of the fuel cell stack;
   a boost converter in electrical connection with the fuel cell stack and the high voltage electrical system, the boost converter transferring electrical power from the fuel cell stack to the high electrical voltage system during fuel normal cell operation;
   a buck converter in electrical connection with the fuel cell stack and the high voltage electrical system and which steps down the first DC operating voltage of the high voltage electrical system to a second DC operating voltage that is lower than the first DC operating voltage, the buck converter further applying the second DC operating voltage to the fuel cell stack; and
   an FCS controller operable to disable the boost converter and enable the buck converter to apply the second DC operating voltage to the fuel cell stack.

10. The fuel cell charging system of claim 9 further comprising a stack discharge circuit that when enabled reduces the voltage of the fuel cell stack through resistive energy discharge.

11. The fuel cell charging system of claim 10 wherein the FCS controller is operable to enable the stack discharge circuit to reduce the fuel cell stack voltage to within a predetermined voltage window having an upper voltage limit and a lower voltage limit when the boost converter is disabled and the buck converter is enabled to apply the second DC operating voltage to the fuel cell stack.

12. The fuel cell charging system of claim 11 wherein the upper voltage limit is from 25 to 50 volts and the lower voltage limit is from 15 to 25 volts.

13. The fuel cell charging system of claim 11 wherein the predetermined voltage window is from 10 to 30 volts.

14. The fuel cell charging system of claim 11 wherein the FCS controller is operable to perform a diagnostic test when the fuel cell stack voltage is within the predetermined voltage window.

\* \* \* \* \*